United States Patent [19]

Kaksonen

[11] Patent Number: 4,813,775
[45] Date of Patent: Mar. 21, 1989

[54] EYEGLASS FRAMES

[76] Inventor: Pirjo M. Kaksonen, 480 Crescent #202, Oakland, Calif. 94610

[21] Appl. No.: 128,663

[22] Filed: Dec. 4, 1987

[51] Int. Cl.⁴ .................................................. G02C 1/08
[52] U.S. Cl. .......................................... 351/92; 351/90
[58] Field of Search ........................ 351/90, 91, 92, 93, 351/94, 95, 96, 97, 98, 99, 100, 101, 102, 45

[56] References Cited

U.S. PATENT DOCUMENTS 2,614,459 10/1952 Ditto ...................................... 351/90
3,826,564 7/1974 Werling Sr. .......................... 351/45

Primary Examiner—Rodney B. Bovernick
Assistant Examiner—Jay Ryan
Attorney, Agent, or Firm—Townsend and Townsend

[57] ABSTRACT

An opthalmic lens holder is disclosed in which an integral, spring-mounted locking mechanism operates to allow the lens holder to expand for removal of the lens.

19 Claims, 1 Drawing Sheet

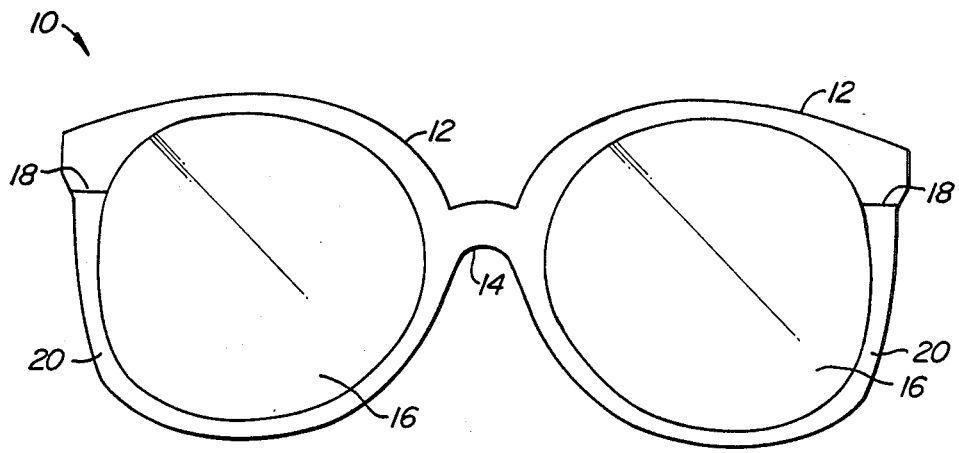
FIG._1.
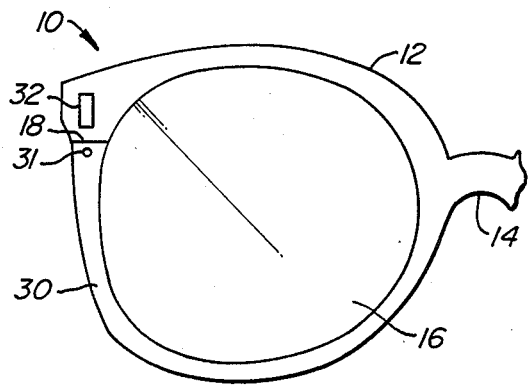
FIG._2.
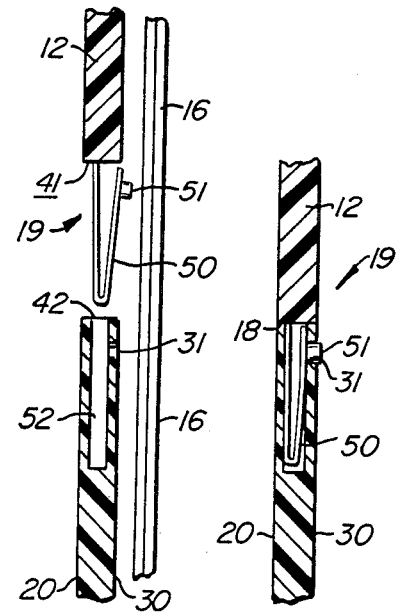
FIG._4.   FIG._5.
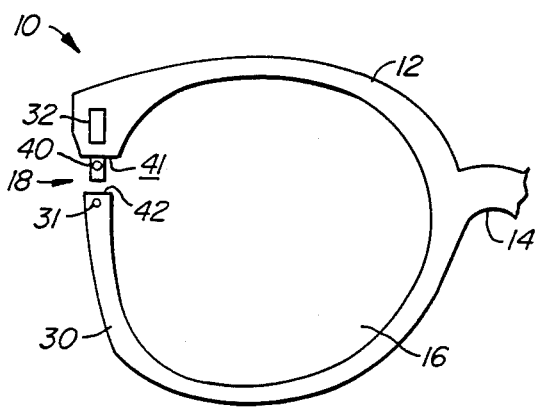
FIG._3.

EYEGLASS FRAMES

BACKGROUND OF THE INVENTION

This invention relates to eyeglass frames, particularly to frames for ophthalmic or corrective lenses. Eyeglass frames come in many styles and colors to suit the diverse tastes of eyeglass wearers. Eyeglasses have become a fashion item, and the color of eyeglass frames may be selected to match moods and wardrobes.

The problem with selecting eyeglass frames to match a wardrobe item or a mood is that prescription lenses are costly. Therefore keeping different sets of lens and frame combinations is often prohibitively expensive. What is needed is a convenient way to transfer lenses from one set of frames to another so that one set of lenses may be worn in a multitude of frames.

Prior art lens frame designs provide mechanisms by which the lenses may be removed from the frame. These prior art frames, however, often require the use of special tools to operate the lens removal mechanisms. Furthermore, the prior art frames and lens removal mechanisms are somewhat unattractive as well as cumbersome.

Therefore one purpose of this invention is to provide an attractive eyeglass frame or ophthalmic lens holder from which the lens or lenses may be easily removed so that one eyeglass frame may be exchanged for another.

SUMMARY OF THE INVENTION

The ophalmic lens holders, according to my invention, finding particular utility when used with eyeglass frames, have a locking feature which is easy to operate and which does not detract from the attractiveness of the frames. When locked, the lens holder holds the lens firmly in place. When unlocked, the lens holder may be expanded to allow for removal of the lens and transfer of the lens to another frame.

The locking mechanism is integral with the lens holder and is substantially hidden from view when the lens holder is locked. In the preferred embodiment, the locking mechanism is a spring-mounted button located in the lens holder at the point at which the lens holder opens. To fasten a lens in the lens holder, the spring and button are inserted into a recess formed in the opposing face of the lens holder. The button snaps into a second recess formed in the lens holder to lock the lens securely in the frame. To remove the lens, the button may be accessed through the second recess and pushed back against the spring to unlock the lens holder. The lens holder may then be expanded and the lens removed.

While the description of my invention refers to the preferred embodiment, the scope of the invention is not limited thereto.

BRIEF DESCRIPTION OF THE DRAWINGS

FIG. 1 is a front view of the eyeglass frames in the condition according to the preferred embodiment;

FIG. 2 is a partial rear view of the eyeglass frames in the locked condition;

FIG. 3 is a partial rear view of the eyeglass frames in the unlocked condition;

FIG. 4 is a sectional view of the fastening means in the unlocked condition; and FIG. 5 is a sectional view of the fastening means in the locked condition.

DETAILED DESCRIPTION OF THE PREFERRED EMBODIMENT

The invention will now be described with reference to the drawings. FIG. 1 shows a front view of the eyeglass frames according to the preferred embodiment of this invention. The frames 10 are formed from plastic in the preferred embodiment, but may be formed from any suitable material.

Frames 10 include two lens holders 12 which surround and secure lenses 16. Lenses 16 may be secured by a rim and groove method as illustrated in U.S. Pat. No. 4,666,265 or by any other suitable method. Lens holders 12 are connected by a bridge 14 and may include hinges 32 to attach temple pieces (not shown). As shown in FIGS. 1-3, frames 10 have a front face 20 and a back face 30. One half of back face 30 of frames 10 is shown in FIGS. 2 and 3. The features of each half are the same.

Lens holders 12 are each split at positions 18 to permit lens holders 12 to assume the unlocked condition of FIG. 3 and the locked condition of FIGS. 1 and 2. Lens holders 12 are each maintained in their locked conditions by a spring detent fastener 19. As seen in FIGS. 3-5, fastener 19 includes a spring element 40, extending from a surface 41 of lens holder 12, and a complementary recess 52 formed within the opposite face 42.

Spring element 40 includes a cantilever spring 50 and a button 51. Spring 50 may be formed from plastic, metal and any other spring material. Spring 50 extends from face 41 and is integral with lens holder 12. Button 51 may be formed from metal or plastic and is attached to spring 50 so button 51 faces in the same direction as back face 30 of frame 10.

Formed in lens holder 12 is a second recess 31 extending from back face 30 through the lens holder 12 and into recess 52. The length recess 52 is slightly greater than the length of spring 50 while the length of recess 31 may be about equal to, slightly less than or slightly greater than the height of button 51. In the locked condition of lens holder 12, button 51 extends into recess 31 and spring 50 is wholly contained by recess 52.

To change lenses, lens holder 12 is unlocked by depressing button 51, which may be accessed through recess 31. Button 51 may be depressed by hand or by use of a pen, paper clip, or other pointed object. Depressing button 51 allows spring 50 and button 51 to be withdrawn from recess 52. As spring 50 is withdrawn from recess 52, lens holder 12 can expand to allow removal of lens 16. Lens 16 may then be inserted into another frame 10 of a different color. When lens 16 is in place within the new lens holder 12, spring 50 is inserted into recess 52 until button 51 snaps into recess 31.

Modification and variation can be made to the invention without departing from the subject of the invention as defined by the following claims. For example, fasteners differing in construction from fasteners 19 may be used. Fastener 19 may be located at other positions about lens holders 12.

I claim:

1. An ophthalmic lens mount, for use with an ophthalmic lens of the type having a rim, comprising:
   a lens holder having a front surface and a back surface disposed opposite to said front surface, said lens holder being adapted to substantially surround and secure the rim of the ophthalmic lens in an orientation substantially parallel to said front and back surfaces, the back surface oriented towards a wearer;

means for separating said lens holder at a chosen position to define first and second opposed surfaces and to permit removal and replacement of said lens, said means for separating comprising a manually operable spring detent fastener element at the chosen position for selectively securing the first and second surfaces to one another to secure the lens in the lens holder when in a locked condition, and for permitting the first and second surfaces to be separated to remove the lens from the lens holder when in an unlocked condition.

2. The lens mount of claim 1 wherein the spring detent fastener element includes a manually actuable element located at the back surface.

3. The lens mount of claim 1 wherein the lens holder includes a temple piece hinge and the chosen position is near the temple piece hinge.

4. The lens mount of claim 1 wherein the lens holder is completely separable at the chosen position.

5. The lens mount of claim 1 wherein the fastener element includes a spring element extending from the first surface and a first recess, sized to house the spring element, formed in the second surface.

6. The lens mount of claim 5 wherein the spring element includes a transversely extending button positioned to face the wearer.

7. The lens mount of claim 6 wherein the lens mount includes a second recess formed in the back surface near the second surface and extending into the first recess, the second recess positioned to at least substantially house the button when the lens holder is in the locked condition.

8. The lens mount of claim 5 in which the spring element is integral with the lens holder.

9. The lens mount of claim 5 in which the spring element is formed from plastic.

10. The lens mount of claim 5 in which the spring element is formed from metal.

11. The lens mount of claim 1 further comprising a second lens holder substantially similar to said lens holder.

12. The lens mount of claim 1 in which the lens holder is formed from plastic.

13. The lens mount of claim 1 in which the lens holder is formed from metal.

14. An ophthalmic lens mount, for use with an ophthalmic lens of the type having a rim, comprising:
    a lens holder having a front surface and a back surface disposed opposite to said front surface, said lens holder being adapted to substantially surround and secure the rim of the ophthalmic lens in an orientation substantially parallel to said front and back surfaces, the back surface oriented towards a wearer;
    means for separating said lens holder at a chosen position to define first and second opposed surfaces and to permit removal and replacement of said lens, said means for separating comprising a manually operable spring detent fastener element at the chosen position for selectively securing the first and second surfaces to one another to secure the lens in the lens holder when in a locked condition, and for permitting the first and second surface to be separated to remove the lens from the lens holder when in an unlocked condition;
    the fastener element including a spring element extending from the first surface and a first recess, sized to house the spring element, formed in the second surface;
    the spring element further including a transversely extending button positioned to face the wearer; and
    a second recess formed in the back surface near the second surface and extending into the first recess, the second recess positioned to at least substantially house the button when the lens holder is in the locked condition.

15. The lens mount of claim 14 wherein the lens holder includes a temple piece hinge and the chosen position is near the temple piece hinge.

16. The lens mount of claim 14 in which the spring element is integral with the lens holder.

17. The lens mount of claim 11 further comprising a second lens holder substantially similar to said lens holder.

18. An ophthalmic lens mount, for use with an ophthalmic lens of the type having a rim, comprising:
    a lens holder having a front surface and a back surface disposed opposite to said front surface, said lens holder being adapted to substantially surround and secure the rim of the ophthalmic lens in an orientation substantially parallel to said front and back surfaces, the back surface oriented towards a wearer, said lens holder being split at a chosen position to define first and second opposed surfaces at the split junction and to permit removal and replacement of said lens; and
    a manually operable spring detent fastener element at the chosen position for selectively securing the first and second surfaces to one another to secure the lens in the lens holder when in a locked condition, and for permitting the first and second surfaces to be separated to remove the lens from the lens holder when in an unlocked condition.

19. An ophthalmic lens mount, for use with an ophthalmic lens of the type having a rim, comprising:
    a lens holder having a front surface and a back surface disposed opposite to said front surface, said lens holder being adapted to substantially surround and secure the rim of the ophthalmic lens in an orientation substantially parallel to said front and back surfaces, the back surface oriented towards a wearer, said lens holder being split at a chosen position to define first and second opposed surfaces at the split junction and to permit removal and replacement of said lens;
    a manually operable spring detent fastener element at the chosen position for selectively securing the first and second surfaces to one another to secure the lens in the lens holder when in a locked condition, and for permitting the first and second surface to be separated to remove the lens from the lens holder when in an unlocked position;
    the fastener element including a spring element extending from the first surface and a first recess, sized to house the spring element, formed to the second surface;
    the spring element further including a transversely extending button positioned to face the wearer; and
    a second recess formed at the back surface near the second surface and extending into the first recess, the second recess positioned to at least substantially house the button when the lens holder is in the locked position.

* * * * *